US010986147B2

(12) United States Patent
Greenlee et al.

(10) Patent No.: US 10,986,147 B2
(45) Date of Patent: Apr. 20, 2021

(54) DISTRIBUTEDLY SYNCHRONIZED EDGE PLAYOUT SYSTEM

(71) Applicant: iHeartMedia Management Services, Inc., San Antonio, TX (US)

(72) Inventors: Daniel Greenlee, Cincinnati, OH (US); Jeffrey Lee Littlejohn, Mason, OH (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 84 days.

(21) Appl. No.: 16/528,154

(22) Filed: Jul. 31, 2019

(65) Prior Publication Data

US 2021/0037074 A1 Feb. 4, 2021

(51) Int. Cl.
*G06F 15/16* (2006.01)
*H04L 29/06* (2006.01)
*G06F 3/16* (2006.01)

(52) U.S. Cl.
CPC .......... *H04L 65/4076* (2013.01); *G06F 3/165* (2013.01); *H04L 65/604* (2013.01)

(58) Field of Classification Search
None
See application file for complete search history.

(56) References Cited

U.S. PATENT DOCUMENTS

2017/0149516 A1* 5/2017 Oh ................ H04N 21/434
2018/0352303 A1* 12/2018 Siddique ............ H04M 3/567

* cited by examiner

*Primary Examiner* — Brian Whipple
*Assistant Examiner* — Gregory P Tolchinsky
(74) *Attorney, Agent, or Firm* — Garlick & Markison; Edward J. Marshall

(57) ABSTRACT

The same sequence of media items is pre-distributed to storage devices at multiple locations. A local program component, including content not in the pre-distributed sequence of media items, is obtained at a first media mixer at a first location. A control signal associated with playout of the pre-distributed media items is obtained at a first processing device co-located with the first media mixer. The local program component is transmitted to a second media mixer located at a second location. Separately from the local program component, the control signal is transmitted from the first processing device to a second processing device, co-located with the second media mixer. The control signal is synchronized to the local program component at the second location to generate a synchronized media program control. The pre-distributed sequence of media items is mixed with the local program component as directed by the synchronized media program control.

20 Claims, 8 Drawing Sheets

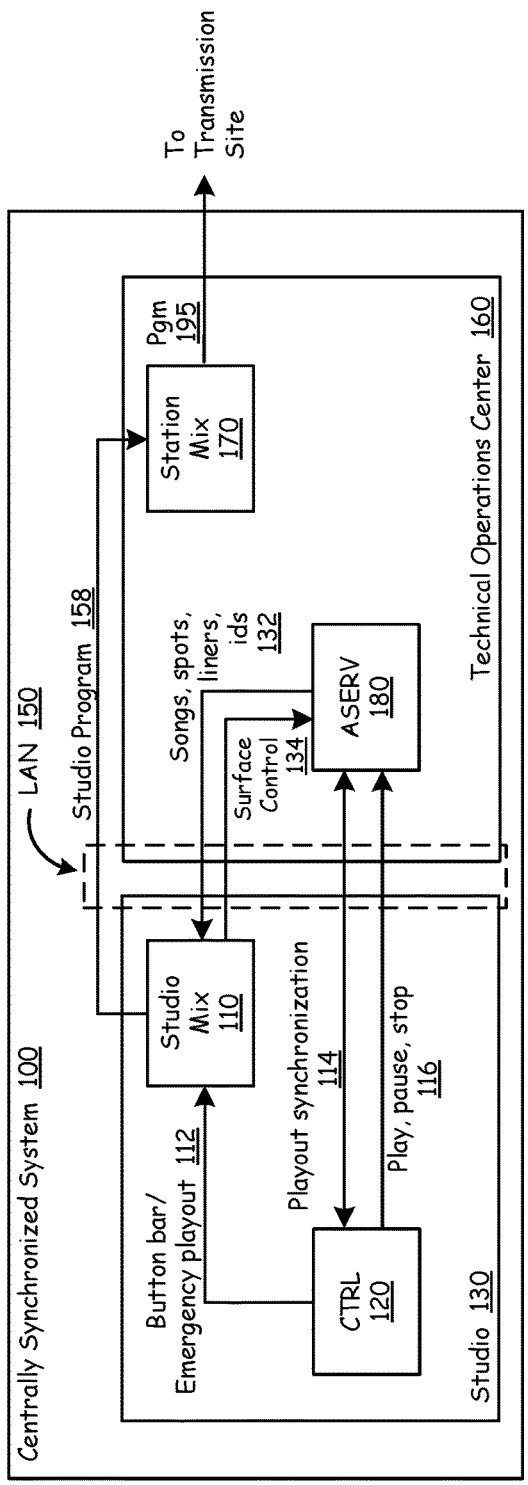
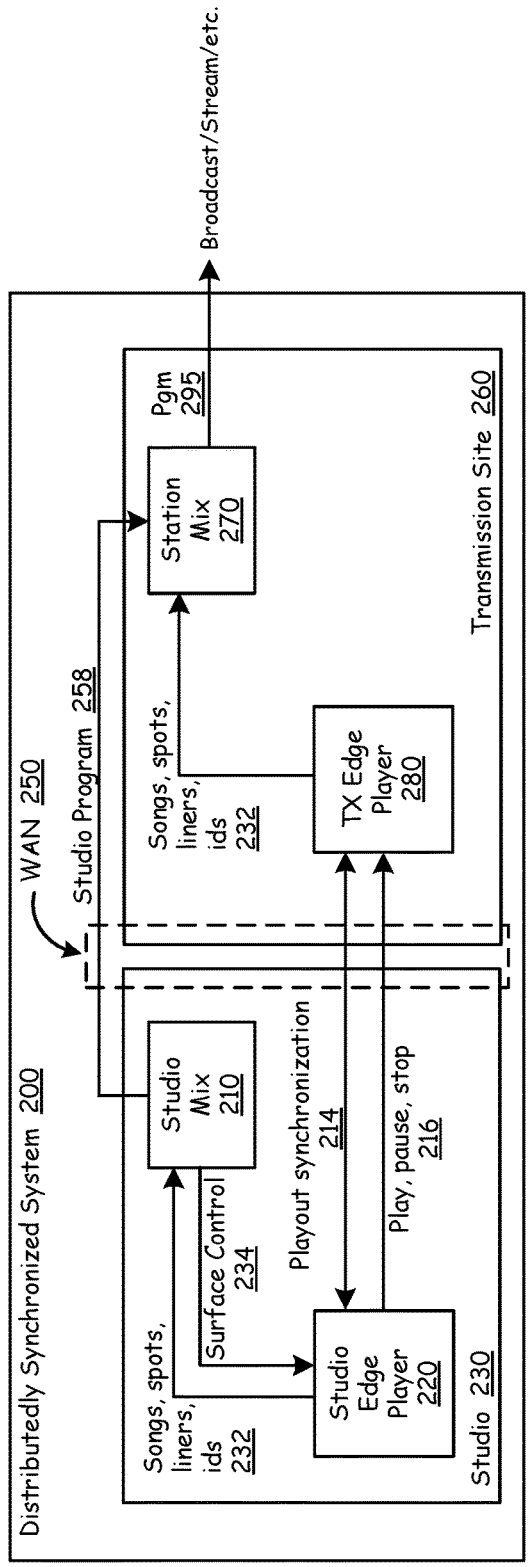
FIG. 1 (Prior Art)
FIG. 2

Studio Flow

Cloud Site Flow

DISTRIBUTEDLY SYNCHRONIZED EDGE PLAYOUT SYSTEM

CROSS REFERENCE TO RELATED PATENTS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to playing out mixed media at multiple remote locations, and more particularly to synchronizing and mixing the media to be played out at each of the multiple remote locations.

2. Description of Related Art

Source media content is often transmitted from a source location to multiple different locations for broadcast or streaming. The content to be broadcast or streamed can, in many cases, include advertisements or other external content inserted en-route to the broadcast or streaming location by a content distribution system, inserted at the broadcast or streaming location, or even inserted at the consumer's local device.

In general, insertion of the external content uses markers included in the source media content, or in a media schedule, to indicate where the external content is permitted to be inserted. Regardless of the exact mechanism used to indicate permissible insertion locations, the source media content is transmitted "as-is" from the source location to the broadcast or streaming locations.

For example, it is common for a radio personality to be in control of a radio broadcast. It is also common for the radio personality to insert a voice-over during playout of a song scheduled to be broadcast or streamed. Due to various network constraints required by playout sequence synchronization, media distribution and other coordination chatter, current systems operate by mixing the voice-over into the song at the source location and transmit the altered song, including the voice-over, to the remote broadcast or streaming locations.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

FIG. 1 is a schematic block diagram of prior art, centrally synchronized, system for distributing media items to remote locations for broadcast or streaming;

FIG. 2 is a generalized schematic block diagram illustrating a distributedly synchronized system for distributing media items to remote locations for broadcast or streaming in accordance with various embodiments of the present disclosure;

Figure 8:
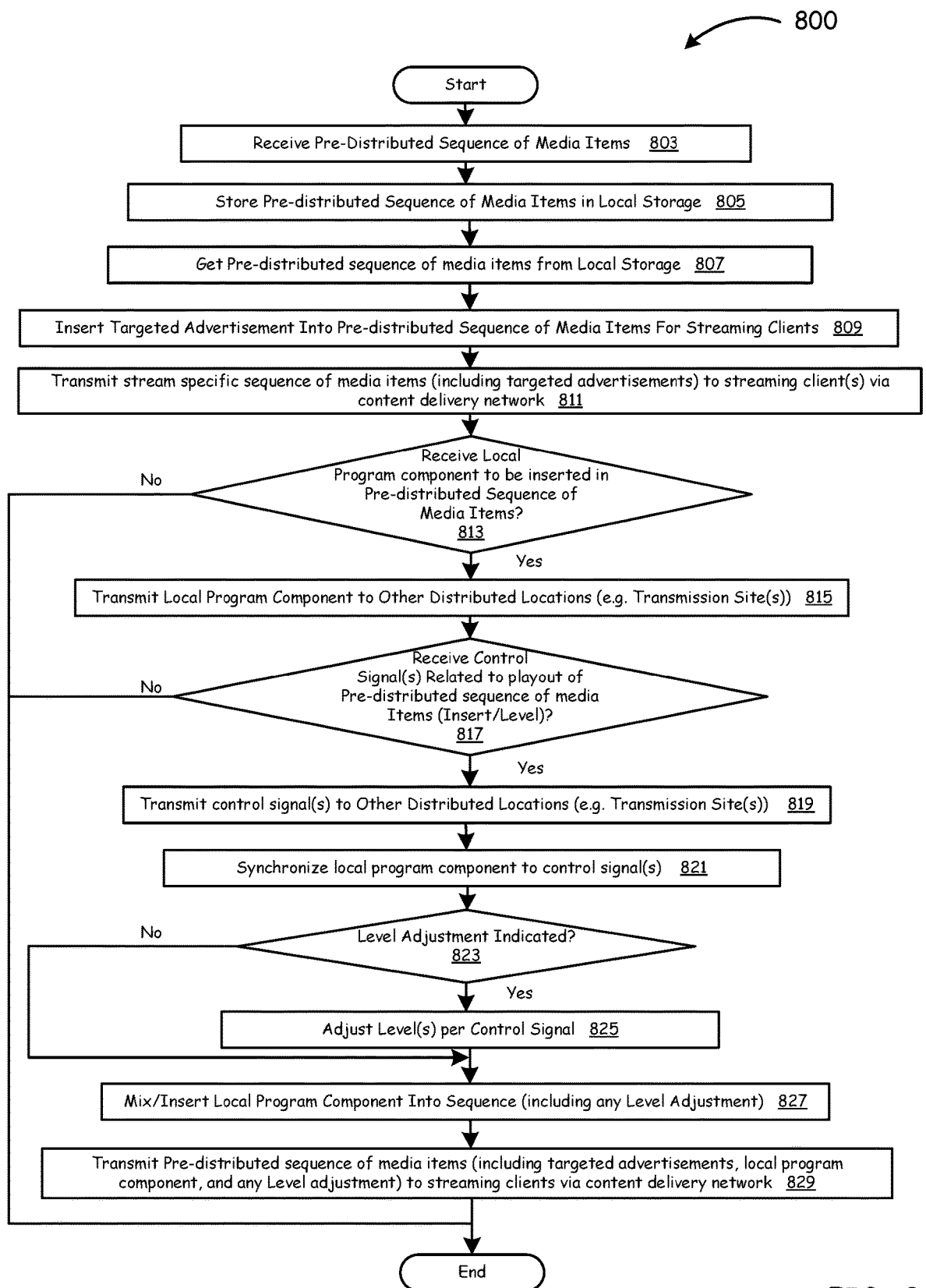
Figure 9:
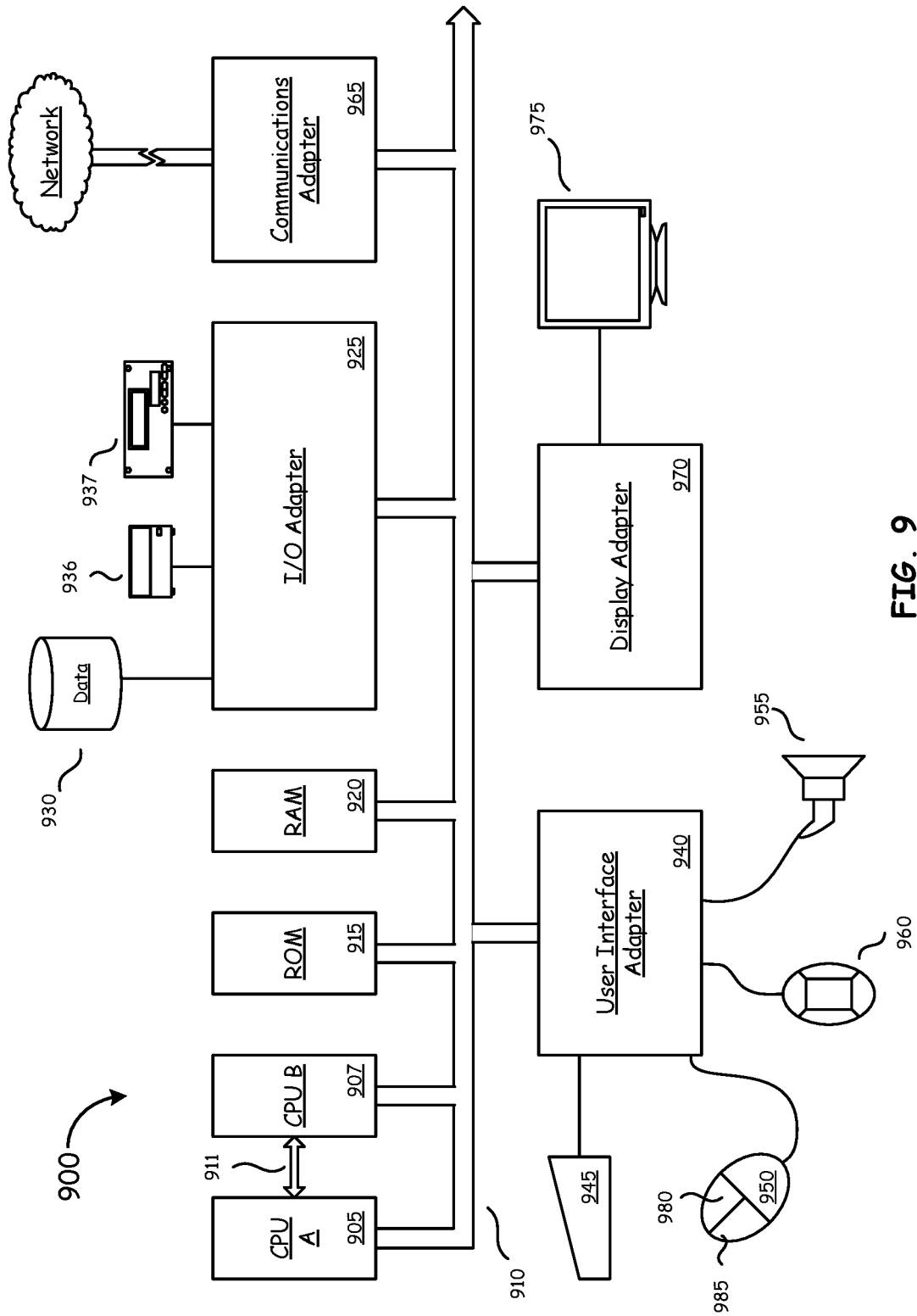

FIG. 8 is a flowchart illustrating a method of distributedly synchronizing media in a system including an intermediate distribution site, in accordance with various embodiments of the present disclosure; and FIG. 9 is a high-level block diagram of a processing system, part or all of which can be used to implement various server, machines, systems, and devices in accordance with various embodiments of the present disclosure.

DETAILED DESCRIPTION OF THE INVENTION

In various embodiments discussed herein, pre-organized media sequences are pre-distributed between one or many locations, and are mixed, interleaved, or otherwise modified to include a local program component. The local program component can, but need not, include live media content, and can originate from any content creation space or broadcast studio. Various embodiments move various functions away from the location providing the local program component to be performed closer to locations that broadcast or stream the pre-organized media sequences. By moving these functions allows various methods, devices, and systems disclosed herein to overcome latency, bandwidth, control, hardware requirements, and system management issues that arise when media distribution systems employ widely distributed broadcasting, streaming, and content creation sites.

Towards that end, a site providing the local program component also provides various control signals that allow a dispersed location to locally synchronize functions performed at that dispersed location, with respect to the pre-organized media sequence and the local program component. Note that the synchronization performed at the dispersed location does not need to be an absolute-in-time synchronization, in which a command is executed at the same time "X" at both the dispersed location and at the site from which the control signal originates. Instead, the synchronization can be a relative synchronization in which the control signal is synchronized to the local program component at each dispersed location.

As used herein, the term "distributedly synchronizing," "distributed synchronization," and similar derivative terms refer to control signals being transmitted from a first location to one or more remote locations, and then synchronizing the control signal to media items at the remote locations. Some or all media items to be synchronized to the control signals can be pre-stored at the remote locations, and are not transmitted with the control signals. Even if separately transmitted control signals and some media content items are synchronized prior to transmission from the first location, various network latency, queuing, transmission speed, and other factors can cause the control signals and media content items to lose synchronization. These network effects are exacerbated when a broadcast or streaming device is connected to an origination site via a wide-area network (WAN) rather than a local area network (LAN). The separately transmitted control signals and media content can be distributedly synchronized (or re-synchronized) at the remote destination, or an intermediate destination remote from the transmission source.

For example, at a studio site, local talent can start talking two seconds before pressing a button to start playout of a particular media item in the distributed media sequence. The local talent will hear both her voice and the media item being played out in response to the button push. The local talent's voice will be sent to the distributed location as a local program component. Separately, a control message, or signal, indicating the button push will be sent to the distributed site. The distributed site will receive both the local program component and the control message indicating the button push, synchronize them, and begin playing out the local program component. Two seconds after the local talent's voice begins playing out at the distributed site, the "button push" will cause the media item to begin playing, replicating at the distributed location the same occurrences taking place at the studio site. Thus, even though there may be a latency delay of 3 seconds (or more) between the studio site and the remote site, playout at the remote, or distributed location will be synchronized relative to the playout of media at the distributed location, even though the playout at the distributed location does not occur at the same absolute time as the playout at the studio site.

Various embodiments disclosed herein, sometimes referred to as a Dual-Edge playout system, distribute pre-organized media sequences between one and many dispersed locations, and provide the ability to distributedly interleaved live content, if applicable, that originates from any content creation space or broadcast studio. Each dispersed location can include an edge playout device that is synchronized to a master edge playout device in a master-slave relationship. The master edge playout device can be in a recording studio during a live broadcast, or at one of multiple transmission sites given a simple automated playout schedule. In at least one embodiment, any edge playout device can be designated as the master edge playout device, which can help create various levels of redundancy when network connectivity or synchronization processes are unavailable from a Studio or Cloud controller.

In some embodiments, every edge playout device is pre-populated with a synchronized media library, local specific content, and other assets that can be re-organized in a matter of seconds from any master controller. Once the playout sequence has been synchronized and ordered properly, live controls can be initiated from a master edge device to each edge device/endpoint subscribed to a show or program, to any of the slaves through a Real-time Transport Protocol (RTP) stream, or otherwise.

The RTP signal input to at any slaved edge playout device can include a dynamic jitter buffer, which checks latency between the master and the slave and automatically adjusts the amount of delay to ensure seamless playback from the transmission source. In at least one embodiment, this process allows content created in the studio to be broadcast 1:1 at every edge playout device, regardless of latency.

Controls such as altering the volume of a music bed during a live talk segment of a radio show can be replicated at each site, reducing possible network bandwidth utilization during live broadcasts by pre-organizing content at the edge playout devices.

In some embodiments, if there is an emergency localized over multiple markets or a single market, this master and slave relationship can be used to broadcast on certain stations from a completely different market/hub via satellite, 4G, or public Internet Service Provider (ISP), if still available. Additionally, shows currently distributed by satellite can have reduced points of failure, and an ability to scale up or down with greater efficiency.

Some, but not all, embodiments disclosed herein may be more easily understood by comparing the prior art, centrally synchronized system 100 of FIG. 1, with the distributedly synchronized system 200 illustrated in FIG. 2.

Referring first to prior art FIG. 1, centrally synchronized system 100 includes a studio 130 and a technical operations center 160 coupled via a high speed, high bandwidth network, such as local area network (LAN) 150, which allows transmission of relatively large amounts of data with minimal latency and delays. Typically, technical operations center 160 and studio 130 are co-located. Studio 130 includes control machine 120, and studio mixer 110. Technical operations center 160 includes audio server (ASERV) 180 and station mixer 170.

ASERV 180 receives surface control signals 134, such as mixing, fade, and volume levels input by an operator of studio mixer 110; and other control signals 116, such as play, pause, and stop commands, from control machine 120. Based on the surface control signals 134 and the other control signals 116, ASERV 180 provides content 132, e.g. songs, spots, liners, and identifiers, to studio mixer 110. ASERV 180 is synchronized to control machine 120 via playout control synchronization signals 114, to ensure that content 132 is properly mixed and/or played out by studio mixer.

Studio mixer 110 receives button bar/emergency playout control signals 112 from control machine 120 and content 132 from ASERV 180, performs any necessary mixing of content, and generates studio program 158. Studio mixer 110 transmits studio program 158 to station mixer 170, which transmits final program 195 to one or more transmission sites at dispersed locations. As can be observed with respect to centrally synchronized system 100, control signals and content are synchronized, and any mixing of or modifications to the content are made prior to transmission to the remote broadcast sites. Thus, there is no need to synchronize the control signals to the content at distributed sites, because the content is broadcast to each broadcast or streaming site in the same form it will be broadcast or streamed. However, a consequence of this centralized synchronization is that all the content to be broadcast, e.g. all the scheduled songs, all the live voice/video overlays, all mixing of media items, etc., are sent from technical operations center 160 to each transmission site. Sending all the content to be broadcast in its final form can consume large amounts of data bandwidth, during transmission to the broadcast site.

It will be appreciated that the phrase "all content in its final form" does not preclude later, automated insertion of media into "empty" schedule slots, insertion of advertisements into spots allocated for advertisement insertion into a broadcast schedule, or automated replacement of prerecorded content.

Referring next to FIG. 2, distributedly synchronized system 200 includes studio 230 and transmission site 260 communicatively coupled via wide area network (WAN) 250. Studio 230 includes studio edge player 220, and studio mixer 210. Transmission site 260 includes TX edge player 280 and station mixer 270, which transmits final program 295 for broadcast, streaming, or another form of transmission to consumers. Note that, as compared to the centrally synchronized system discussed with respect to prior art FIG. 1, distributedly synchronized system 200 moves the synchronization and mixing processes to distributed transmission sites, such as transmission site 260. Moving the synchronization and mixing processes to the distributed transmission sites allows distributedly synchronized system 200 to employ pre-distributed content stored at transmission site 260, thereby reducing the amount of information that needs to be included in transmissions to transmission site 260. That is, unlike centrally synchronized system 100 illustrated in prior art FIG. 1, distributedly synchronized system 200 does not need to transmit "all content in its final form" from the studio to the transmission sites.

In at least one embodiment, the distributed synchronization performed at transmission site 260 synchronizes studio program 258, to the control signals 216 and content 232. This distributed synchronization is not performed by prior art system 100 (FIG. 1), because in prior art system 100 content 132 is included in studio program 158, while in distributedly synchronization system 200, content 232 is pre-distributed to transmission site 260 and is not included in studio program 258. Also note that in prior art system 100, play, stop, and pause, level, and similar controls are not even distributed to remote transmission sites.

In distributedly synchronized system 200, studio edge player 220 transmits content 232 to studio mixer 210, and control signals 216, such as playout, pause, and stop control signals, to transmitter edge player 280. Studio mixer 210 transmits surface control signals 234 to studio edge player 220. Surface control signals 234 include instructions generated by a studio mixing console, such as levels, tally, on/off status, etc. In at least some embodiments, control signals 216 include surface control signals 234.

Playout synchronization 214 synchronizes the playout of pre-scheduled media items, which are pre-stored at transmission site 260, according to a broadcast schedule. In at least one embodiment, playout synchronization 214 can be performed using various clock synchronization techniques known to those of ordinary skill in the art. By synchronizing the clocks used by computing devices at the various distributed locations, scheduled playout of media items at transmission site 260 can be performed at scheduled times.

Playout synchronization 214 is, in various implementations, separate from the distributed synchronization performed at transmission site 260. In at least one embodiment, scheduled transmission times of media items according to a broadcast schedule can be adjusted to accommodate distributed synchronization requirements needed to synchronize the relative timing relationship between a local program component included studio program 258 and a control signal 216. For example, the scheduled playout of a scheduled media item at transmission site 260 can be delayed to ensure that the relative timing between voice-over content included in studio program 258 is synchronized with a "start" command or a "volume level" command associated with a particular media item to be broadcast or streamed.

Figure 3:
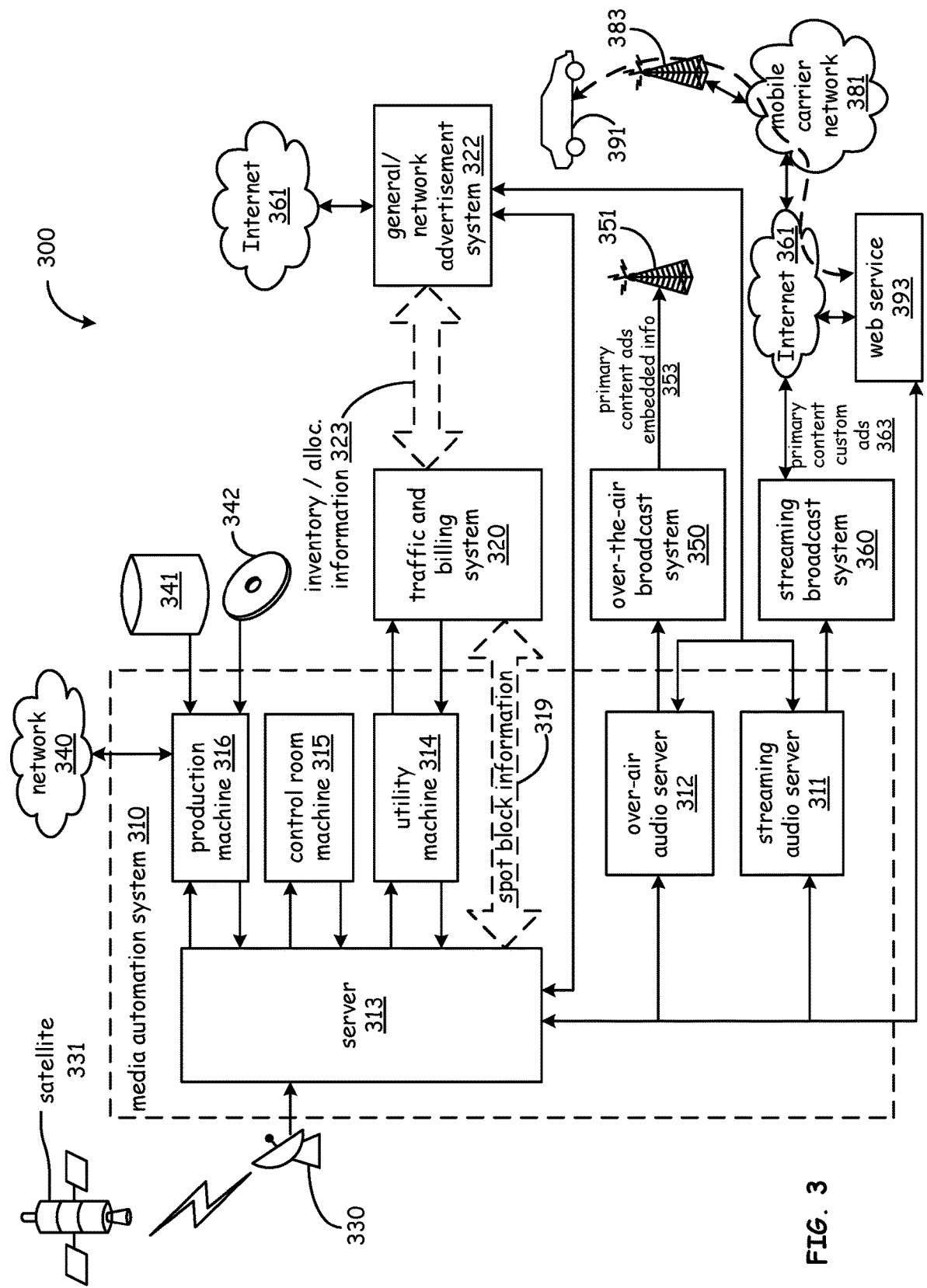
FIG. 3 is a schematic block diagram illustrating a broadcasting system in accordance with various embodiments of the present disclosure.

Referring next to FIG. 3 system 300, in which distributed synchronization devices and techniques can be incorporated, will be discussed. System 300 includes media automation system 310, for example a NexGen® automation system, which can control and automate various media broadcast functions; and traffic and billing system 320, for example a Viero® traffic system, which can provide control for various traffic and billing functions such as entering and editing orders, and scheduling spots. System 300 also includes streaming broadcast system 360, through which a streaming broadcast of media content can be provided to one or more consumer media system 391 via one or more networks, such as Internet 361 and/or mobile carrier network 381 via cell tower 383. In addition to streaming broadcast system 360, system 300 can include over-the-air broadcast system 350, through which media content is broadcast to consumer media system 391 via broadcast tower 351. In at least some embodiments, over-the-air broadcast system 350 transmits to broadcast tower 351, complete broadcast content 353, which includes primary content, advertisements, and embedded information. The complete broadcast content 353 is not necessarily coextensive with final program content discussed subsequently herein.

Various media sources can also be included in system 300, for example individual source media 342, database 341, programming from another market and received via network 340, and programming broadcast via satellite 331, which can be received via satellite receiver 330. In some embodiments, although not explicitly illustrated, satellite 331 can broadcast content directly to consumer media system 391. Although not specifically illustrated, in various embodiments a streaming station can be substituted for a satellite broadcast station by consumer media system 391, using the same or similar techniques used for substituting the streaming station for a terrestrial over-the-air broadcast. Note that in some embodiments, over-the-air broadcasting can include both satellite-based over-the-air broadcasting and terrestrial over-the-air broadcasting.

System 300 may also include advertisement system 322, sometimes referred to as an external advertisement system, or a network advertisement system, which can be used for provisioning general advertisement content for streaming and broadcast airplay via the traffic and billing system 320. The traffic and billing system 320 and the advertisement system 322 may communicate with each other, and/or with over-the-air audio server 312 and/or streaming audio server 311 to coordinate local and general advertisement content.

In general, traffic and billing system 320 can be used to provide control and monitoring of the sale and scheduling of spot blocks containing one or more spots, and to determine which spot blocks are to be played on which streaming and broadcast stations at particular times. This information can be provided in the form of a log file in some embodiments. Media automation system 310 can use server 313 to gather programming and media information from various sources, and combine that information with spot block information 319 to generate a log file indicating a substantially complete representation of which media and spots are to be broadcast. The log file and related information can be provided to both over-the-air audio server 312 and streaming audio server 311 for broadcast over their respective systems.

Media automation system 310, as illustrated, can include production machine 316, which receives media content from network 340, database 341, individual source media 342; control room machine 315; and utility machine 314, each of which is connected to server 313. Media automation system 310 can also include over-the-air audio server 312, which provides media content to over-the-air broadcast system 350; and streaming audio server 311, which provides audio content to streaming broadcast system 360. Server 313 can provide audio, images, video, or mixed media content to one or both of over-the-air audio server 312 and streaming audio server 311. Note that even though audio servers are illustrated and discussed, the techniques and principles described herein can also be applied to images, video and mixed media content.

In at least one embodiment, one or more of the illustrated servers can be realized as a virtual server implemented on the same hardware as another of the illustrated servers. In each case, however, implementation of a server requires the use of hardware, and general reference to a "server," unless otherwise explicitly stated or required by the context, includes hardware components used to implement the server functionality. Furthermore, various distributed processing techniques can be used to spread functionality of one or more of the illustrated servers across multiple different machines.

In various embodiments, programming provided by streaming audio server 311 to streaming broadcast system 360 can be the same programming provided by over-the-air audio server 312 to over-the-air broadcast system 350. In many instances, however, particular spots included in the various spot blocks provided to over-the-air broadcast system 350 and streaming broadcast system 360 can vary, even though the length and timing of the spot blocks themselves are generally consistent with each other.

A streaming station that provides substantially the same primary programming as an over-the-air station, even if some or all of the advertisements or ancillary content may be different, can be said to be a "corresponding streaming station" with respect to the over-the-air station. In general, the more closely the primary content of a streaming station matches the primary content of an over-the-air station, the more closely those stations are said to correspond. If a particular media station duplicates its primary content on a streaming station, even if advertisements and ancillary content are not exactly duplicated, or the timing of the primary content is offset or slightly altered, that streaming station can be said to be an "exactly corresponding streaming station." A streaming station that includes over 50% of the same primary content broadcast by an over-the-air station can be said to be a "loosely corresponding streaming station" to the over-the-air station. A streaming station that does not necessarily broadcast identical media items at the same time or in the same order as an over-the-air station, but that streams primary content of the same genre and style included in a broadcast of the over-the-air station, can be said to be a "tangentially corresponding streaming station" to the over-the-air station. Unless otherwise specified, reference herein to a "corresponding streaming station" can include any or all of exactly corresponding, loosely corresponding, or tangentially corresponding streaming stations.

In some embodiments, system 310 can be, for example, a radio automation system used to control media content broadcast via multiple different radio stations in a single market, with some or all system elements and subsystems co-located in a single physical facility. In other embodiments, media automation system 310 can be a radio automation system used to provide control of radio stations in different markets, in different locations, or via different distribution channels. In an illustrated embodiment, media automation system 310 is used to control media broadcast over the air via on-air broadcast system 350 and broadcast tower 351, and streaming media provided to the Internet 361 via streaming broadcast system 360. Broadcast stations and media delivery devices in addition to those illustrated in FIG. 3 can also be controlled by media automation system 310. It should be appreciated that media automation system 310 can also be used with television and other types of media that may broadcast programming via multiple different stations or outlets.

Media automation system 310 can obtain media to be broadcast from various sources. For example, production machine 316 can obtain information from broadcasts in other markets via network 340. Production machine 316 can also obtain media from database 341, which may be a database local to production machine 316, or local to another server or machine that is part of media automation system 310. In other embodiments database 341 can be maintained by a third-party media provider, which can be remote from media automation system 310. Production machine 316 can also obtain media to be broadcast from individual media sources, such individual source media 342, which may include any of various non-volatile media storage elements, including but not limited to optical disks, e.g. compact discs (CDs), digital video disks (DVDs), various types of magnetic and electromagnetic storage media, or the like.

Production machine 316 can provide some or all of the media to be broadcast to server 313. In addition to the media provided to server 313 from production machine 316, satellite receiver 330 can also provide satellite content to be inserted into a broadcast via over-the-air audio server 312 and streaming audio server 311. Server 313 can also receive media, a local program component, and playout control signals related to content to be broadcast, from control room machine 315. Control room machine 315 may include a studio in which a live broadcast is being generated, such as a talk show or other similar live program, but control room machine 315 can also provide media to server 313 other than live media.

Additionally, control room machine 315 can provide server 313 with various control functions, and in some cases an operator can manually add or remove spots, programming, and other content that server 313 has previously slotted for broadcast. Thus, for example, an operator in control room machine 315 may determine that a previously scheduled spot in a particular spot block is not to be broadcast for any of various reasons. Upon making that determination, control room machine 315 can be used to send a signal to server 313. In response to the signal, server 313 can remove the spot from its previously scheduled spot block. In some embodiments, the removed, or "bumped" spot is not delivered to over-the-air audio server 312 for over-the-air broadcast, nor is it delivered to streaming audio server 311 for streaming broadcast. In various embodiments control room machine 315 can be used to generate and transmit various control signals, such as volume levels; timing signals; and playout controls such as pause, start, and stop.

Traffic and billing system 320 is, in some embodiments, connected to server 313 via a utility machine 314. In other embodiments, traffic and billing system may be connected to server 313 through other machines, for example control room machine 315, production machine 316, or directly connected to server 313. In other embodiments, traffic and billing system 320 and server 313 can be included in a single machine, or collection of machines that are co-located or connected in a distributed fashion. In yet further embodiments, traffic and billing system 320 can include local instances or subsystems associated with one or more media stations, and a backend subsystem used to provide centralized control or services to each of the local instances or subsystems.

In various embodiments, spot block information 319 can include requests for identification of potential spots available for inclusion in an under-filled spot block, responses to such requests, bumped spot notifications, broadcast logs and lists, spot files, parameters related to available, unavailable, and potential spots, spot block parameters, ranks, conditional information, various status information related to spots, and the like.

Also, traffic and billing system 320 may be connected to the advertisement system 322. The advertisement system 322 can, in various embodiments, operate to provide network inventory directly to media automation system 310 for broadcast in accordance with a broadcast log specifying inventory allocations 323 generated by the traffic and billing system 320. Traffic and billing system 320 can provide the broadcast log to server 313 of media automation system 310. In some embodiments, the broadcast log can include entries that specify spots reserved for playout of local inventory by media automation system 310, and placeholder, or network, entries specifying particular portions of spot blocks reserved for playout of network inventory by advertisement system 322.

The media automation system 310 can play out media content for broadcast in accordance with the broadcast log using, for example, over-the-air media server 312 or streaming media server 311. Some, or all, of the content broadcast using over-the-air media server 312 and streaming media server 311 can include primary and/or advertising content delivered by server 313. In at least some embodiments, content delivered by server 313 includes separate information to be embedded in a broadcast at or near the time of broadcast by over-the-air media server 312, streaming media server 311, over-the-air broadcast system 350, or streaming broadcast system 360. In other embodiments, the content delivered by server 313 can include pre-embedded information. In at least some embodiments, broadcast servers such as over-the-air media server 312 and streaming media server 311, or broadcast systems such as or over-the-air broadcast system 350 and streaming broadcast system 360 can create and embed their own content.

Information can be embedded in a broadcast signal using various techniques, including, using a Radio Data System (RDS) protocol, using in-band-on-channel (IBOC) techniques such as those used in HD Radio™ transmissions, including a non-user-perceptible watermark in the broadcast, or using various other signal encoding techniques.

In some implementations, network advertisement system 322 can pre-deliver customized advertisements to consumer media system 391, e.g. via streaming audio server 311, for later insertion locally into the corresponding streaming station, rather than inserting the customized advertisements into streaming station content 363. Advertisement system 322 can also deliver customized advertisements directly to consumer media system 391 via Internet 361 or mobile carrier network 381 (not specifically illustrated). In those cases, advertisement system 322 can simply report to traffic and billing system 320, server 313, over-the-air audio server 312, streaming audio server 311, or some combination thereof, various information associated with advertisements delivered directly to consumer media system 391.

Advertisement system 322 can select custom advertisements to be inserted in streaming station content 363, or to be delivered to consumer media system 391 for later insertion based on profile, demographic, registration, history of usage, or other information collected using consumer media system 391, or obtained from a user or passenger profile associated with the web service 393. It will be appreciated that various advertisement insertion techniques can be used in conjunction with the distributed synchronization techniques and devices discussed herein.

Various system configurations can be used to implement the teachings set forth herein, and are not limited to the exact configurations discussed with reference to FIG. 3. For example, although at least one embodiment includes separate traffic and billing systems, similar functionality can be provided using a single, integrated or system having one or more local or distributed processing, storage and communication elements. Thus, although embodiments including separate automation and traffic systems are primarily discussed herein, other embodiments can be implemented without the need for cooperation between separate automation and traffic systems.

Figure 4:
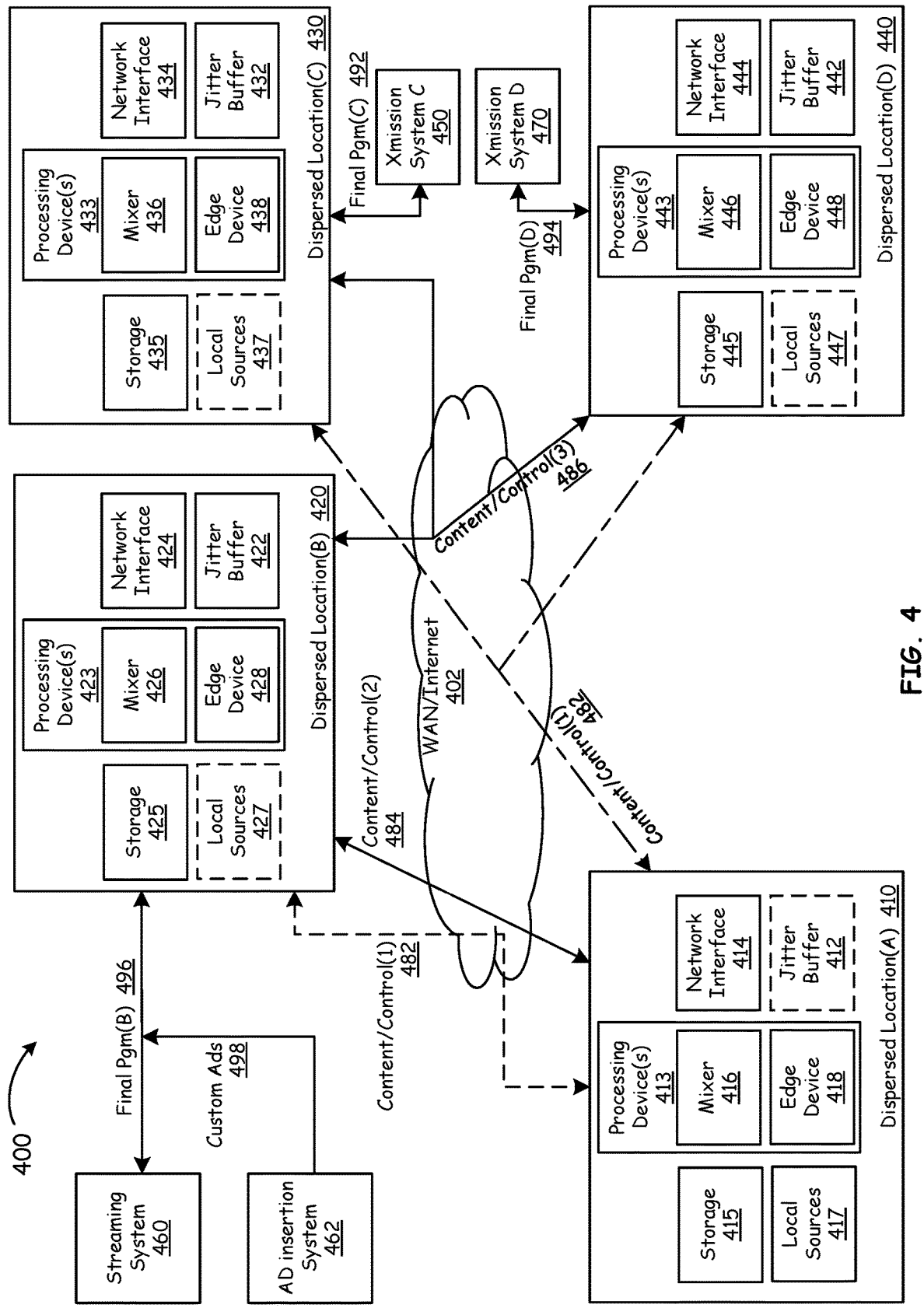
FIG. 4 is a schematic block diagram illustrating a de-centralized media playout system including multiple dispersed locations, in accordance with various embodiments of the present disclosure.

Referring next to FIG. 4, a de-centralized media playout system 400 including multiple dispersed locations will be discussed in accordance with various embodiments of the present disclosure. De-centralized media playout system 400 includes processing devices operating at multiple dispersed locations connected via wide area communications network (WAN) 402. The dispersed locations can be connected to various broadcast, streaming, and/or content insertion systems. To simplify the nomenclature used herein, unless otherwise required by the context, reference to a particular dispersed location should be understood to include a reference to devices present at that particular dispersed location.

The multiple dispersed locations illustrated in FIG. 4 include dispersed location (A) 410, dispersed location (B) 420, dispersed location (C) 430, and dispersed location (D) 440. Dispersed location (A) 410 includes storage device 415, which can be used to store a pre-distributed common sequence of media items such as media items included in a broadcast schedule; local sources 417, which can include various local visual and audio capture devices, microphones, cameras, or other systems used to playout various visual or audio snippets, background items, sounds, or the like; network interface 414, which can include various wired or wireless communication interfaces to local and our wide area networks; processing device(s) 413, which in turn includes mixer 416 and edge device 418; and optionally jitter buffer 412, which can be used to assist in performing distributed synchronization of content and control information received from another dispersed location when dispersed location (A) 410 is not acting as a master.

Mixer 416 can include any of various mixing devices, surfaces, applications, and various combination thereof that can be used to combine multiple different media items into a single media items, or to insert, organize, and modify the common sequence of media items to include local program content in accordance with various control signals.

Dispersed location (B) 420 includes storage device 425, which can be used to store the same pre-distributed common sequence of media items stored at dispersed location (A) 410; network interface 424, which can include various wired or wireless communication interfaces to local and our wide area networks; jitter buffer 422, which can be used for distributed synchronization of content and control information received from another dispersed location; processing device(s) 423, which in turn includes mixer 426 and edge device 428; and optionally local sources 427, which can include various local visual and audio capture devices, microphones, cameras, and/or other systems. Dispersed location (B) 420 transmits final program (B) 496 to streaming system 460.

Dispersed location (C) 430 includes storage device 435, which can be used to store the same pre-distributed common sequence of media items stored at dispersed location (A) 410; network interface 434, which can include various wired or wireless communication interfaces to local and our wide area networks; jitter buffer 432, which can be used for distributed synchronization of content and control information received from another dispersed location; processing device(s) 433, which in turn includes mixer 436 and edge device 438; and optionally local sources 437, which can include various local visual and audio capture devices, microphones, cameras, and/or other systems. Dispersed location (C) 430 transmits final program (C) 492 to transmission system (C) 450, which can include content distribution systems, over-the-air broadcast systems, streaming broadcast systems, web services, or the like.

Dispersed location (D) 440 includes storage device 445, which can be used to store the same pre-distributed common sequence of media items stored at dispersed location (A) 410; network interface 444, which can include various wired or wireless communication interfaces to local and our wide area networks; jitter buffer 442, which can be used for distributed synchronization of content and control information received from another dispersed location; processing device(s) 443, which in turn includes mixer 446 and edge device 448; and optionally local sources 447, which can include various local visual and audio capture devices, microphones, cameras, and/or other systems. Dispersed location (D) 440 transmits final program (D) 494 to transmission system (D) 470, which can include content distribution systems, over-the-air broadcast systems, streaming broadcast systems, web services, or the like.

Jitter buffers 412, 422, 432, and 442 can be implemented as data areas where messages including local program components and control signals can be collected, stored, and sent to mixer 416 at an appropriate time. Variations in arrival times between local program components and control signals, referred to herein as jitter, can occur because of network congestion, timing drift, or route changes. Jitter buffers 412, 422, 432, and 442 can intentionally delay transmitting either local program components or control signals to mixers 416, 426, 436, or 446 so that the relative timing between the local program components and control signal, as that timing relationship existed at the master dispersed location, is restored at each of the other dispersed locations. Jitter buffers 412, 422, 432, and 442 can be implemented as either static or dynamic jitter buffers. In at least one embodiment, dynamic jitter buffers are used to allow each dispersed location to automatically adapt to changes caused by varying network conditions.

Ad insertion system 462 is illustrated at part of de-centralized media playout system 400, but may be a third-party system that is separate from de-centralized media playout system 400 in some embodiments. Ad insertion system 462 can be used to select and insert custom advertisements 498 into final program (B) 496 prior to final program 496 being received by streaming system 460. Note that the term "final program" is used herein to refer to completion of the mixing process at a distributed location, and unless specifically stated to the contrary, does not necessarily preclude downstream alteration of the "final program." For example, in some embodiments, a "final program" can be altered after the mixing process is completed by inserting new media items in empty schedule positions, inserting advertisements into scheduled advertisement spots, inserting customized content into the "final program," and the like.

In various embodiments any of the dispersed locations can be selected as a "master" location to provide separate control signals and local program components to the other dispersed locations. For example, in an embodiment illustrated in FIG. 4, dispersed location (A) 410, is designated as the master location, but in other embodiments another location can designated as the master location. Designation as a master location can be based on manual or automated pre-configuration, negotiation among the various dispersed sites, determination by one or more dispersed sites that the sufficient bandwidth is available, determination that connectivity to one or more other dispersed sites/locations has been lost or restored, or the like. For example, a non-master dispersed location can assume status as the master if communications with the current master location is lost or degraded beyond a predetermined quality threshold. In other embodiments, if multiple dispersed locations determine that communications with a current master location have been lost or degraded, the remaining dispersed locations can take over the duties of the master location in a predefined order. In yet other embodiments each dispersed location can simply operate independently, if a communications channel with the current master location is lost or degraded.

The following discussion assumes that dispersed location (A) 410, is designated as the master location. In at least one such embodiment, dispersed location (A) 410 is a broadcast studio controlled, at least partially, by live talent such as a talk show host or a disc jockey. Dispersed location (B) 420 is a cloud service, and dispersed location (C) 430 and dispersed location (D) 440 are broadcast transmission sites.

In one implementation, as illustrated by broken lines, dispersed location (A) 410 separately transmits content and control information (1) 482 to each of dispersed location (B) 420, dispersed location (C) 430, and dispersed location (D) 440 via WAN 402. Each of the dispersed locations will distributedly synchronize the separately transmitted content and control information, and use that synchronized information, in conjunction with a previously distributed sequence of media items, to generate final program content that incorporates local program components transmitted by dispersed location (A) 410 in accordance with control signals/messages also transmitted by dispersed location (A) 410.

In another implementation, as illustrated by solid lines, dispersed location (A) 410 separately transmits content and control information (2) 484 to a single dispersed location, such as dispersed location (B) 420, which can act as an intermediary between dispersed location (A) 410 and the other dispersed locations. In various embodiments, dispersed location (B) 420 can be implemented as a cloud service. Dispersed location (B) 420 can synchronize content and control messages (2) 484 before generating and transmitting content and control messages (3) 486 to the other dispersed locations. In other embodiments (not explicitly illustrated), dispersed location (B) 420 can forward content and control messages (2) 484 to the other dispersed locations rather than generating new content and control messages.

In various embodiments, content and control messages (2) 484 and content and control messages (3) 486, each include separately transmitted local program components obtained from dispersed location (A) 410. Note that even if dispersed location (B) 420 synchronizes the local program components and the control messages, the separately transmitted local program components and control messages from dispersed location (B) 420 may still arrive at the other dispersed locations out of synchronization with each other due to network factors or otherwise. Thus, distributed synchronization can still be performed by dispersed location (C) 430 and dispersed location (D) 440 in at least some embodiments.

Synchronization of the separately transmitted local program components and control messages can be performed using various signal processing techniques, such as using a training field, or other portion of a header or message, to align messages including the local program components and the control message, using time stamps included in messages to determine a relative timing relationship, using jitter buffers, or some combination thereof. The local program components and control messages can also be indirectly synchronized to each other by including information indicating relative timing to a scheduled broadcast of one or more particular media items. For example, if a level adjustment control signal is received 3 seconds after a start control signal is received, the message including the level adjustment control signal can include a +3 seconds relative time reference relative to the previous control signal.

Figure 5:
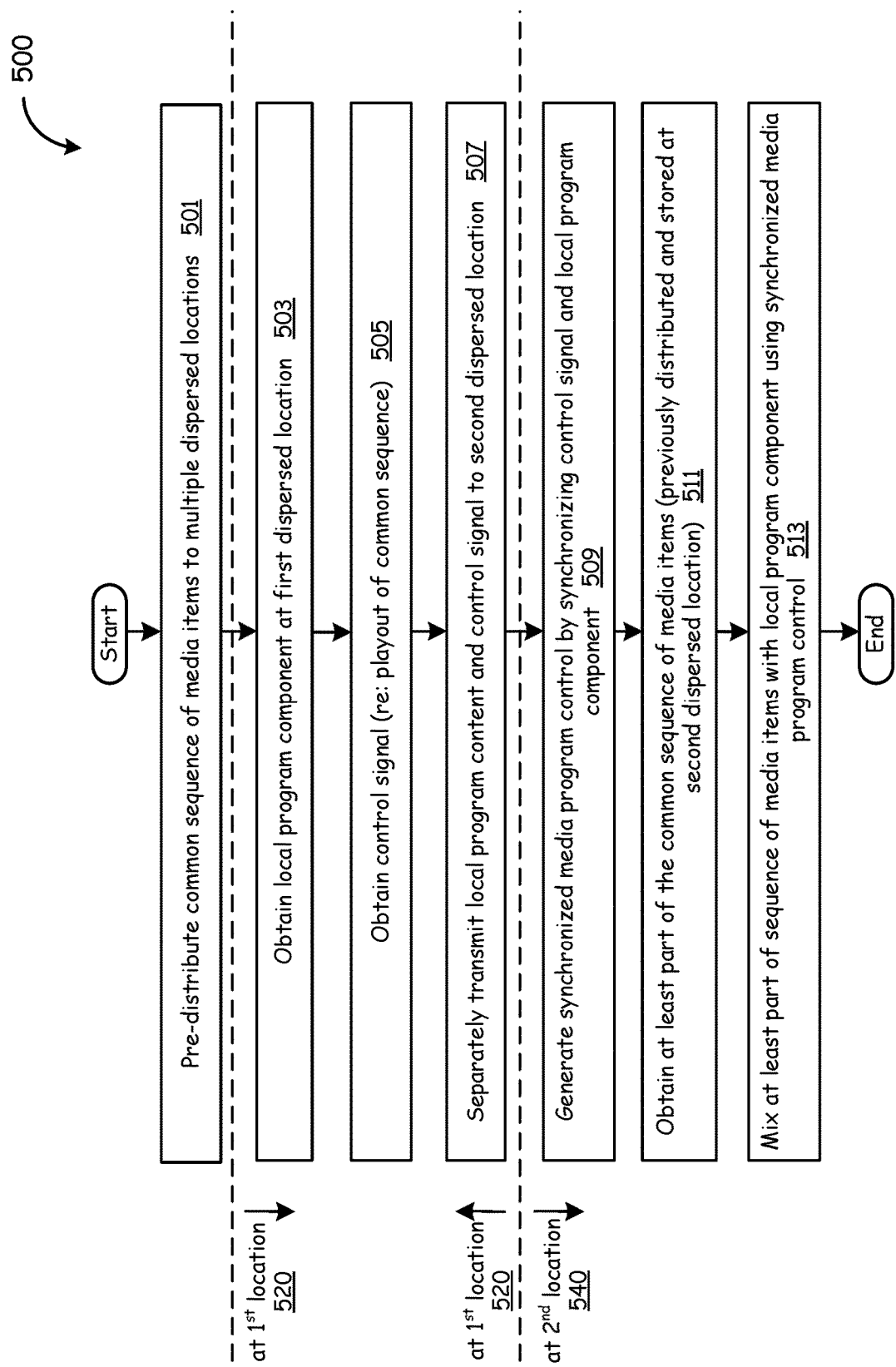
FIG. 5 is a flowchart illustrating a method of distributedly synchronizing media content and control signals, in accordance with various embodiments of the present disclosure.

Referring next to FIG. 5 a method 500 of distributedly synchronizing media content and control signals will be discussed in accordance with various embodiments of the present disclosure. As illustrated by block 501, a common sequence of media items is pre-distributed to multiple dispersed locations. The common sequence of media items can include a broadcast schedule indicating particular media items, and an order in which they are to be broadcast. The common sequence of media items can also include a schedule indicating nominal times at which the sequence is to be started and stopped, and can actually include a full or partial program log with spot blocks to be filled in locally, and other information needed for a complete broadcast. In some instances, the common sequence of media item can be distributed at the same time as a media transmission schedule, while in others the common sequence of media items can be fetched by processing devices at each of the multiple dispersed locations.

The distribution can be provided via physical media that is copied to storage at each dispersed location, via an individual or bulk network file transfer, or in some cases can made using a storage device that need only be installed into an appropriate hardware slot at each dispersed location. The result of pre-distributing the common sequence of media items is that each of the media items included in that sequence is made locally available to a mixer at the dispersed location in advance of the media item being needed.

In some implementations, a master location can pre-distribute the common sequence of media items weeks, days, hours, or even minutes before the media items will be needed for a broadcast. In other embodiments, the common sequence of media items is provided to each of the distributed locations from a central repository as part of a regularly scheduled download of media items. The common sequence of media items may be delivered individually, or in some sequence other than the common sequence, and then ordered at each location based on a broadcast schedule. In other embodiments, the common sequence of media items is not stored in the common sequence, but can be retrieved in the common sequence.

For example, a media library can be stored at each of the distributed locations, and a media transmission/broadcast schedule specifying the common sequence in which the media items are to be played. Upon receipt of the schedule, each distributed location can to determine if all the media items in the common sequence are available in local storage. If not, any missing media items can be requested and stored locally, in anticipation of being broadcast. The common sequence of media items if referred to as a "common sequence," because each of the media items included in the common sequence can be obtained locally at each distributed location.

As illustrated by block 503, a processing device at first location 520 obtains a local program component. The first location 520 can be, for example, a recording studio with one or more microphones and video capture devices, and the local program component can be a voice over, a video or still image, part or all of a recorded interview, a talk show, or the like. In some cases, the local program component can be a prerecorded media item to be mixed into the common sequence of media items for broadcast. In other embodiments, the local program component is captured in real-time. In at least one embodiment the local program component is captured and delivered to a mixer implemented on a processing device at the first location 520.

As illustrated by block 505, a control signal is captured at the first location. This control signal can be related to playout of the common sequence of media items. For example, a control signal can include a command to "start" playing out the next media item in the common sequence of media items. Additional control signals can indicate a start volume of both the media item in the sequence and the local program component, a fade parameter, or the like. Control signals can be transmitted in messages including a time stamp and a code indicating an action corresponding to the time stamp, in some embodiments.

As illustrated by block 507, one or more devices at the first location 520 separately transmit the local program content and the control signals to another dispersed location, in this example second location 540. In some embodiments, a single device can transmit both the local program component and the control signals, while in other embodiments different devices initiate transmission of the local program content and the control signals. For example, a mixer can begin transmitting a message or stream including the local program component as the mixer receives the local program component. Similarly, the mixer can begin transmitting a control signal in response to receiving the control signal from a local edge device. In other embodiments, however, a local edge device can transmit control signals, while a local mixer can transmit the local program component. The local program component and the control signals can be transmitted via different network paths, but in the same network, or even over different networks.

As illustrated by block 509, one or more devices at second location 540 cooperate to generate a synchronized media program control by synchronizing the separate control signal and local program component received from first location 520. Synchronizing restores the original timing relationship between the control signal and the local program component. By performing the synchronization independently at each distributed location, variances in transmission conditions across different network paths can be accounted for. Note that if a control signal referencing a local program component is received at second location 540, but the referenced local program component is not received, second location 540 can simply ignore the received control signal and proceed to transmit the common sequence of media items without alteration.

As illustrated by block 511, the second location obtains at least part of the common sequence of media items from local storage. Note that the common sequence of media items stored locally at the second location includes items that have not been altered using the local program component and the media program controls transmitted by first location 520. As illustrated by block 513, second location 540 mixes at least part of the common sequence of media items with the local program component, using the synchronized media program control.

In an overall example of operation, first location 520 transmits a local program component from a studio mixer to another mixer at second location 540, and separately transmits a control signal from a studio edge device to another edge device at second location 540. Second location 540 distributedly synchronizes the control signal to the local program component, thereby generating a synchronized media control. The second location 540 retrieves at least one of the media items included in the common sequence of media items from local storage, and mixes the local program component into the common sequence of media items using the synchronized media control. In at least one embodiment, this procedure allows the modified common sequence of media items being broadcast or streamed from second location 540 to replicate a modification made to a media item included in the common sequence of media items at first location 520, without requiring transmission of the already-modified media item from the first location 520 to the second location 540.

Figure 6:
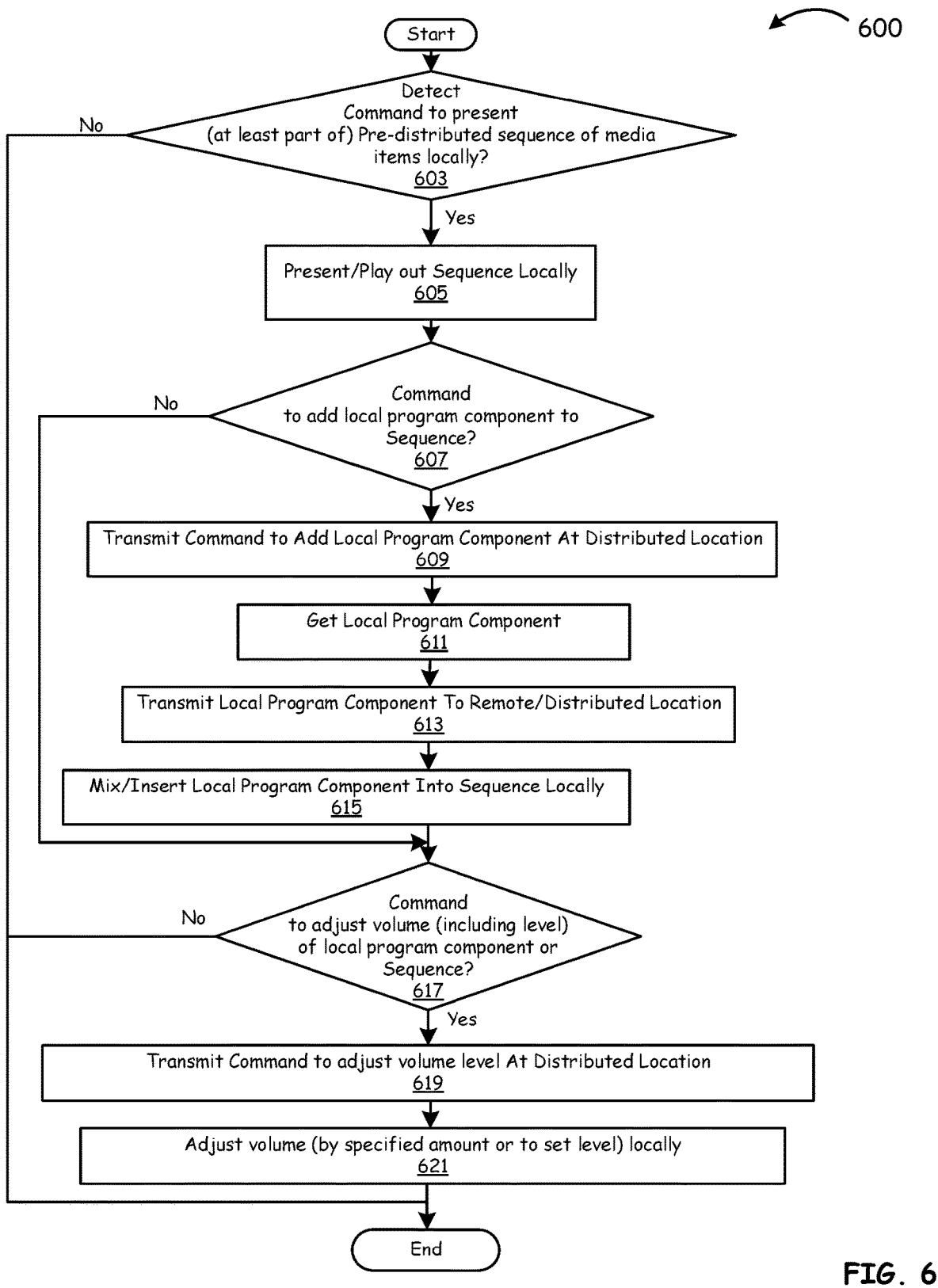
FIG. 6 is a flowchart illustrating a method of providing a local program component and associated control signals to be distributedly synchronized by remote locations, in accordance with various embodiments of the present disclosure.

Referring next to FIG. 6, a method 600 of providing a local program component and associated control signals to be distributedly synchronized by remote locations will be discussed in accordance with various embodiments of the present disclosure. Method 600 can be performed at a broadcast studio, a recording studio, or at another distributed location designated as a "master," location for purposes of generating and transmitting local program components and control signals.

As illustrated by block 603, a studio mixer determines whether a command has been locally issued, e.g. by a studio edge device, to locally present a pre-distributed sequence of media items. For example, local talent controlling a studio mixer can activate a physical or software "button" or other control to begin playout of a media item included in a locally stored sequence of media items, which has also been distributed to other dispersed locations for which the studio location is acting as a "master." The control activation can be received from a device providing input directly to the mixer, or from a device connected indirectly to the mixer. In some implementations, a start playout or other command can be an automated command issued by a studio edge device according to a broadcast schedule, and need not be a manual "start" command.

As illustrated by block 605, the mixer can begin to playout the media item included in the sequence of media items locally. For example, local talent can hear what is being played out through headsets or speakers, or in the case of a visual media broadcast the media being played out can be viewed locally on a computer monitor, television, or other display.

As illustrated by block 607, a check can be made to determine if a local program component is to be added to sequence of media items being played out. If the check at block 607 indicates that there is not a command to mix a local program component into the sequence of media items, method 600 proceeds to block 617. If a local program component is to be mixed with the sequence of media items, the command to mix the local program component can be transmitted to one or more distributed locations, as illustrated by block 609, and the local program component can be obtained at block 611. As illustrated by blocks 613 and 615, once obtained, the local program component is obtained it can be transmitted to the distributed locations and locally mixed into the media content being played out locally, for observation by the local talent.

As illustrated by block 617, a check is made to see if a command has been received to adjust a level of either a local program component or a media item included in the sequence of media items. If not, method 600 ends. However, as illustrated by blocks 619 and 621, if a command has been received to adjust a level of either a local program component or a media item included in the sequence of media items, that command is transmitted to the distributed locations, and is also used locally.

In an illustration of operation, assume a morning radio personality is controlling operation of a studio. He puts on headsets to listen to what is being broadcast, and hears a song playing. Noting that the song is almost ending, and it is close to time for him to start his morning show, the radio personality activates a software button on his control software that issues a command for a "morning show" intro to fade in over the almost-finished song. The command to fade-in includes a volume level command that concurrently adjusts the volume of both a local program component and the volume level of an already started media item. The command to fade-in the morning show intro is transmitted to multiple remotely distributed locations.

Activating the software button also results in the mixer fetching a customized morning show intro from a thumb drive or other local storage device. After retrieving the morning show intro, it is transmitted to multiple remote locations, and is also sent to a studio mixer. The studio mixer mixes the morning show intro into the media item being played so that the morning show personality can hear the mixed item. The morning show intro transmitted to the other distributed locations will be synchronized, at each remote location, to the command, which was also transmitted to those locations. The remote locations will synchronize the command and the local program component, and mix the local program into a locally stored version of the same media item being played, to generate a broadcast or stream that replicates what was being locally played out at the studio.

It should be noted that method 600 need not involve live transmission of local program content, but can, in some embodiments, also be performed in advance of a scheduled playout of a common sequence of media items. For example, if a 5 or 10 second delay is desired to provide a host with the ability to screen callers, distributed synchronization of local program components and control signals can still provide the benefit of not requiring mixed media items to be transferred from one location to another. Instead, only a small amount of data, e.g. the control signals and the local program content, need to be transmitted, because the local program content can be synchronized and mixed with the sequence of media items at the broadcast end of the chain, rather than at the originating end of the chain.

Figure 7:
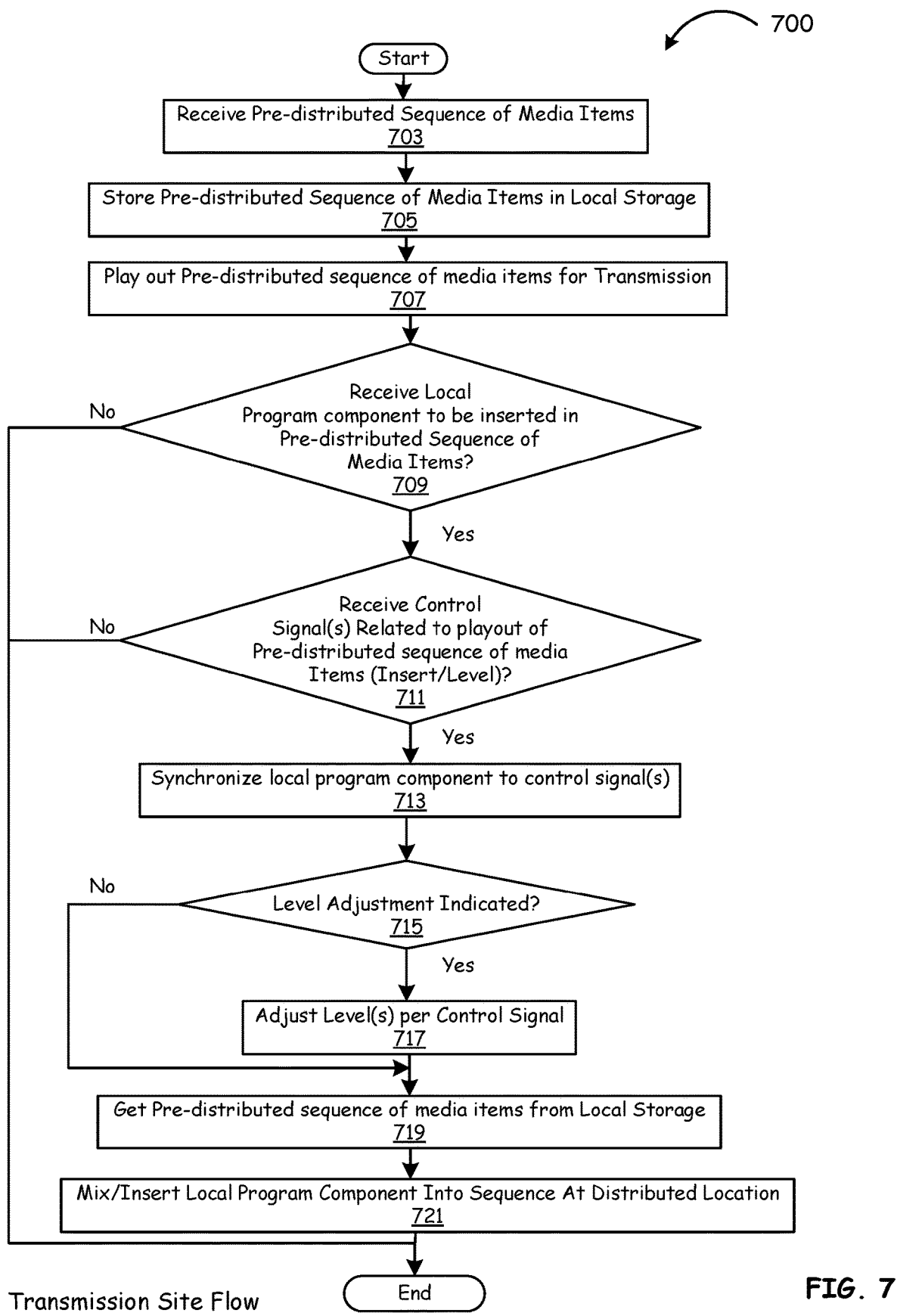
FIG. 7 is a flowchart illustrating a method of distributedly synchronizing media for broadcast or streaming at a location remote from a source location, in accordance with various embodiments of the present disclosure.

Referring next to FIG. 7, a method 700 of distributedly synchronizing media for broadcast or streaming at a location remote from a source location will be discussed in accordance with various embodiments of the present disclosure. In at least one embodiment, method 700 can be performed by processing devices located at a transmission site that broadcasts and/or streams media programs to consumers. Although the following examples use the term "transmission site," the invention(s) described are not limited to implementation at transmission sites. Furthermore, the term "transmission site" does not require the local presence of a physical broadcast tower or the like. Instead, the term "transmission site" is used herein to refer to an edge location that transmits a final program, such as final program (B) 496, final program (C) 492, or final program (D) 494 shown in FIG. 4 to a broadcast chain, a streaming chain, a content distribution system, or the like.

As illustrated by block 703 and 705, a pre-distributed sequence of media items is received and locally stored at a transmission site. The same pre-distributed sequence of media items, referred to as a common pre-distributed sequence of media items, is also pre-distributed to other distributed locations, including other transmission sites, cloud sites, and a source location, such as a studio site.

As illustrated by block 707, the transmission site plays out the pre-distributed sequence of media items for broadcast, streaming, or other transmission. In some embodiments, playout of the pre-distributed sequence of media items can begin prior to receiving any messages from a studio site or other source site that include control signals or local program components, for example in response to automatically generated playout commands associated with a broadcast log. In other embodiments, playout of the pre-distributed sequence of media items, can begin in response to a playout control signal or command received from another distributed location. In yet further embodiments, control signals and local program components can be received before playout of the pre-distributed sequence of media items begins.

As illustrated by block 709, the transmission site determines whether it has received a local program component to be inserted or mixed into the common pre-distributed sequence of media items. The local program component is, in various embodiments, received from another distributed location acting as a "master" location, such as a studio site, another transmission site, or a cloud site. If not, the method ends, and playout of the pre-distributed sequence of media items continues as scheduled.

If a local program component has been received, a check is made at block 711 to determine whether a control signal related to playout of the pre-distributed sequence of media items has been received at the transmission site. In various embodiments, the control signal is received from the same source as the local program component, but in a separate message or transmission. In at least one embodiment, a control signal can provide information and control related to mixing the local program component with the pre-distributed sequence of media items, such as various level information, timing information from which a timing relationship between the control signal and the local program component can be determined, or the like. If no control signal has been received, method 700 ends.

As illustrated by block 713, if both a local program component and a control signal have been received, the control signal and the local program component can be synchronized to each other, and in some implementations to a schedule associated with the pre-distributed sequence of media items.

As illustrated by block 715, a check is made to determine whether a level adjustment to either the local program component or to the pre-distributed sequence of media items is to be made. For example, if the control signal(s) indicates that the local program component is a voice-over to be inserted at the beginning of a particular media item included in the pre-determined sequence of media items, the control signal(s) can include information about level adjustments. The level adjustment information can include information specifying absolute or relative volume levels, relative volume level adjustment amounts, timing of volume adjustments, or the like. For visual media the control signal(s) can indicate appropriate level information, such as brightness, transparency, color saturation, image sharpness, apparent focal point, or the like.

As illustrated by block 717 and 719, one or more media items included in the pre-distributed sequence of media items can be retrieved from local storage, and the levels of either or both the local program component and the pre-distributed sequence of media items can be adjusted in accordance with the control signal.

As illustrated by block 721, the local program component can be mixed with the pre-distributed sequence of media items at the transmission site, in accordance with the control signal(s).

In some implementations, the various steps of method 700 can be modified or rearranged without departing from the spirit and scope of the present disclosure. For example, block 711 can be performed prior to block 709, so that if no control signal is received within a threshold amount of time, the method ends without checking for a local program component. In other embodiments, the local program component and any control signals received can be checked for a source designation and matched to each other based on that source designation, so that control signals and local program components from multiple dispersed locations can be received, synchronized, and inserted into the same pre-distributed sequence of media items. Other modifications can be made to the various methods disclosed herein, so long as those modifications are made consistent with the teachings set forth herein.

Referring next to FIG. 8, a method 800 of distributedly synchronizing media in a system including an intermediate distribution site will be discussed in accordance with various embodiments of the present disclosure. In at least one embodiment, method 800 can be performed by processing devices located at a cloud site that acts as a streaming service or broadcast source, while also providing an intermediate distribution site that transmits control signals and local program components to multiple dispersed locations on behalf of a source locations. Although the term "cloud site" is used below for ease of reference, the invention(s) described are not limited to cloud processing sites.

As illustrated by blocks 803 and 805, the cloud site receives and stores a common pre-distributed sequence of media items. As illustrated by block 807, the cloud site retrieves one or more of the media items included in the pre-distributed sequence of media items from storage.

As illustrated by block 809, the cloud site can obtain customized advertisements from an advertisement service, and insert the advertisements into the pre-distributed sequence of media items to generate a stream-specific sequence of media items. Note that the common pre-distributed sequence of media items remains unchanged. As illustrated by block 811, in various embodiments the cloud site begins transmission of the stream-specific sequence of media items to streaming clients via a content distribution network.

Note that in other embodiments, the cloud site does not receive and insert the custom advertisements. Instead, the advertisements are inserted later, by a separate, custom advertisement insertion service or module. In some such embodiments, therefore, rather than transmitting a stream-specific sequence of media items, the cloud site transmits the common pre-distributed sequence of media items, in the same manner discussed with reference to other distributed sites.

As illustrated by block 813, the cloud site determines whether it has received a local program component to be inserted or mixed into the common pre-distributed sequence of media items, which also results in the local program component being mixed into the stream-specific sequence of media items. The local program component is, in at least one embodiment, received from another distributed location that relies on the cloud site to distribute the local program component and control signals to other dispersed locations. If no local program component is received, the method ends, and playout of the pre-distributed sequence of media items, by extension the stream-specific sequence of media items, continues as scheduled.

As illustrated by block 815, if a local program component has been received, the local program component is transmitted to one or more additional distributed locations. In some embodiment transmitting the local program component to the other locations includes forwarding the message including the local program component, for example by simply replacing a destination in the message header with the address(es) of the other locations to which the local program content is to be sent. In other embodiments, the cloud location receives multiple local content components, determines which local content components are to be distributed to particular dispersed locations, and creates new messages including one or more local program components, and transmits those local program components to particular dispersed locations. Because each dispersed location distributedly synchronizes each of the local program components to control signals, in various embodiments latency introduced by generating messages that include multiple local program components can be accounted for, or in some cases simply ignored.

A check is made at block 817 to determine whether a control signal related to playout of the pre-distributed sequence of media items has been received at the transmission site. As with messages including local program components, the cloud site can forward, aggregate, or otherwise transmit control signals to one or more dispersed locations, as shown by block 819. If no control signal has been received, method 800 ends.

As illustrated by block 821, the cloud site synchronizes the control signal and the local program component to each other, and in some implementations to the pre-distributed sequence of media items. Note that in some embodiments the synchronization can be performed prior to transmitting the local program component and a corresponding control signal to other dispersed devices, thereby allowing an intermediate synchronization prior to transmitting the local program component and the control signal. In other embodiments, the synchronization is performed for local use by the cloud site in mixing the local program component with the pre-determined sequence of media items, and no synchronization is performed on local program components or control signals sent to other dispersed locations.

As illustrated by block 823, a check is made to determine whether a level adjustment to either the local program component or to the pre-distributed sequence of media items is indicated by the control signal. If no level adjustment is to be made, method 800 proceeds to block 827. However, if a level adjustment is to be made, the appropriate level adjustment is performed at block 825, and the pre-distributed sequence of media items is mixed with the local program component in accordance with the control signal(s), as illustrated by block 827.

As illustrated by block 829, the pre-distributed sequence of media items, as mixed and modified at block 827, can be transmitted to streaming clients. One or more media items included in the pre-distributed sequence of media items can be retrieved from local storage, and mixed with the local program component.

Referring now to FIG. 9, a high-level block diagram of a processing system is illustrated and discussed. Processing system 900 includes one or more central processing units, such as CPU A 905 and CPU B 907, which may be conventional microprocessors interconnected with various other units via at least one system bus 910. CPU A 905 and CPU B 907 may be separate cores of an individual, multi-core processor, or individual processors connected via a specialized bus 911. In some embodiments, CPU A 905 or CPU B 907 may be a specialized processor, such as a graphics processor, other co-processor, or the like.

Processing system 900 includes random access memory (RAM) 920; read-only memory (ROM) 915, wherein the ROM 915 could also be erasable programmable read-only memory (EPROM) or electrically erasable programmable read-only memory (EEPROM); input/output (I/O) adapter 925, for connecting peripheral devices such as disk units 930, optical drive 936, or tape drive 937 to system bus 910; a user interface adapter 940 for connecting keyboard 945, mouse 950, speaker 955, microphone 960, or other user interface devices to system bus 910; communications adapter 965 for connecting processing system 900 to an information network such as the Internet or any of various local area networks, wide area networks, telephone networks, or the like; and display adapter 970 for connecting system bus 910 to a display device such as monitor 975. Mouse 950 has a series of buttons 980, 985 and may be used to control a cursor shown on monitor 975.

It will be understood that processing system 900 may include other suitable data processing systems without departing from the scope of the present disclosure. For example, processing system 900 may include bulk storage and cache memories, which provide temporary storage of at least some program code in order to reduce the number of times code must be retrieved from bulk storage during execution.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further, note that the memory element may store, and the processing module, module, processing circuit, and/or processing unit execute, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined so long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method comprising:
   pre-distributing a common sequence of media items to storage devices at a plurality of dispersed locations;
   obtaining, at a first media mixer located at a first dispersed location, a local program component, wherein the local program component includes media content not included in the common sequence of media items;

obtaining a control signal at a first processing device co-located with the first media mixer at the first dispersed location, wherein the control signal is associated with playout of the common sequence of media items;

transmitting the local program component from the first media mixer located at the first dispersed location to a second media mixer at a second dispersed location;

separately transmitting the control signal from the first processing device, co-located with the first media mixer at the first dispersed location, to a second processing device, co-located with the second media mixer located at the second dispersed location;

at the second dispersed location, synchronizing the control signal to the local program component to generate a synchronized media program control;

at the second media mixer located at the second dispersed location:
 obtaining at least a portion of the common sequence of media items;
 obtaining the local program component;
 obtaining the synchronized media program control; and
 mixing the local program component and the at least a portion of the common sequence of media items in accordance with the synchronized media program control.

2. The method of claim 1, wherein:
obtaining the control signal includes monitoring user activation of a playout control associated with a media item included in the common sequence of media items; and
in response to detection of a user activation of the playout control, the method further including:
 transmitting the control signal to the first media mixer; and
 transmitting the control signal to the second processing device, co-located with the second media mixer located at the second dispersed location.

3. The method of claim 2, further comprising:
determining that a user has activated a playout control configured to begin playout of the media item included in the common sequence of media items;
in response to determining that the user has activated the playout control configured to begin playout:
 beginning local playout of the media item at the first dispersed location; and
 transmitting a begin-playout control signal instructing the second media mixer at the second dispersed location to begin playout of the media item.

4. The method of claim 2, further comprising:
determining that a user has activated a playout control configured to alter a volume level of the media item included in the common sequence of media items;
in response to determining that a user has activated the playout control configured to alter a volume level of the media item:
 altering a local volume level of the media item; and
 transmitting a volume-level control signal instructing the second media mixer at the second dispersed location to alter a playout volume level of the media item.

5. The method of claim 1, wherein synchronizing the control signal includes:
using a jitter buffer to synchronize the control signal to the local program component.

6. The method of claim 1, wherein the second media mixer and the second processing device are part of a cloud-based media delivery service located at the second dispersed location, the method further including:
 transmitting the local program component from the second media mixer located at the second dispersed location to a third media mixer at a transmission site; and
 separately transmitting the control signal from the second processing device to a third processing device, co-located with the third media mixer located at the transmission site.

7. The method of claim 1, wherein:
synchronizing the control signal to the local program component includes restoring an original relative timing between the control signal and the local program component, irrespective of any latency associated with the control signal.

8. A system comprising:
a plurality of storage devices located at a plurality of dispersed locations, each of the plurality of storage devices storing a common sequence of media items;
at least a first processing device located at a first dispersed location;
at least a second processing device located at a second dispersed location;
the at least a first processing device located at a first dispersed location configured to:
 obtain a local program component including media content not included in the common sequence of media items;
 obtain a control signal associated with playout of the common sequence of media items;
 transmit the local program component from the at least a first processing device to the at least a second processing device located at the second dispersed location;
 separately transmit the control signal from the at least a first processing device to the at least a second processing device;
the at least a second processing device located at the second dispersed location configured to:
 synchronize the control signal to the local program component to generate a synchronized media program control;
 obtain at least part of the common sequence of media items from a storage device at the second dispersed location;
 obtain the local program component;
 obtain the synchronized media program control; and
 insert the local program component into the at least a part of the common sequence of media items in accordance with the synchronized media program control.

9. The system of claim 8, wherein:
obtaining the control signal includes monitoring user activation of a playout control associated with a media item included in the common sequence of media items; and
the at least a first processing device, in response to detection of a user activation of the playout control, is further configured to:
 perform, at the first dispersed location, an action associated with the playout control; and
 transmit the control signal to the at least a second processing device at the second dispersed location.

10. The system of claim 9, wherein the at least a first processing device is further configured to:
    determine that a user has activated a playout control configured to begin playout of the media item included in the common sequence of media items; and
    the at least a first processing device, in response to determining that the user has activated the playout control configured to begin playout, is further configured to:
        begin local playout of the media item at the first dispersed location; and
        transmit a begin-playout control signal instructing the at least a second processing device at the second dispersed location to begin playout of the media item.

11. The system of claim 9, wherein the at least a first processing device is further configured to:
    determine that a user has activated a playout control configured to alter a volume level of the media item included in the common sequence of media items;
    the at least a first processing device, in response to determining that the user has activated the playout control configured to alter a volume level of the media item, is further configured to:
        alter a local volume level of the media item; and
        transmit a volume-level control signal instructing the at least a second processing device at the second dispersed location to alter a playout volume level of the media item.

12. The system of claim 9, further including:
    a jitter buffer located at the second dispersed location, the jitter buffer configured to synchronize the control signal to the local program component.

13. The system of claim 8, wherein the at least a second processing device is part of a cloud-based media delivery service located at the second dispersed location, the system further including:
    at least a third processing device located at a transmission site; wherein
    the at least a second processing device is further configured to:
        transmit the local program component from the second dispersed location to the transmission site; and
        separately transmit the control signal from the second dispersed location to the transmission site.

14. A media system comprising:
    one or more processing devices located at a first dispersed location, each of the one or more processing devices including a processor, associated memory, and a network interface coupled to a communications network;
    the one or more processing devices configured to implement a first media mixer and a first edge playout device;
    a first storage device, co-located with the one or more processing devices located at the first dispersed location, the first storage device configured to store a sequence of media items pre-distributed to a plurality of second storage devices located at a plurality of second dispersed locations;
    the one or more processing devices configured to implement a first mixer and a first edge playout device, wherein;
    the first mixer is configured to:
        obtain a local program component from an input device co-located with the one or more processing devices at the first dispersed location;
        obtain, from the first storage device, a media item included in the sequence of media items;
        obtain a control signal from the first edge playout device;
        mix the local program component and the media item included in the sequence of media items in accordance with the control signal; and
        transmit the local program component, but not the media item included in the sequence of media items, to second mixers located at the plurality of second dispersed locations;
    the first edge playout device is configured to detect activation of a media playout control associated with playout of the media item included in the sequence of media items, and in response to detecting activation of the media playout control:
        transmit the control signal to the first media mixer; and
        transmit the control signal to second edge playout devices located at the plurality of second dispersed locations, wherein the control signal is synchronized to the local program component at the plurality of second dispersed locations.

15. The media system of claim 14, wherein the first edge playout device is further configured to:
    detect activation of a media playout control configured to alter a volume level of the media item included in the sequence of media items;
    in response to determining that a user has activated the media playout control configured to alter a volume level of the media item:
        altering a local volume level of the media item; and
        transmitting a volume-level control signal instructing the second mixers at the second dispersed locations to alter a playout volume level of the media item.

16. The media system of claim 14, further comprising:
    jitter buffers located at the plurality of second dispersed locations, the jitter buffers each configured to synchronize the control signal to the local program component at each of the plurality of second dispersed locations.

17. The media system of claim 16, wherein the jitter buffers are further configured to:
    restore an original relative timing between the control signal and the local program component, irrespective of any latency associated with the control signal.

18. The media system of claim 14, further comprising:
    at least one or more additional processing devices configured to implement a cloud-based media delivery service, wherein:
        the first mixer is configured to transmit the local program component to the second mixers via the cloud-based media delivery service; and
        the first edge playout device is configured to transmit the control signal to the second edge playout devices via the cloud-based media delivery service.

19. The media system of claim 14, further comprising:
    the second mixers and the second edge playout devices, and wherein:
    each of the second mixers is dispersed from other second mixers, and is co-located with one of the second edge playout devices; and
    the second mixers are configured to mix the local program component and the media item included in the sequence of media items in accordance with the control signal, subsequent to synchronization of the control signal to the local program component.

20. The media system of claim 14, wherein:
the second mixers are configured to generate a final program mix to be broadcast based on the control signal, the local program component, and the sequence of media items that was previously distributed; and
in response to a loss of communication with the one or more processing devices located at the first dispersed location, the second mixers are configured to generate a final program mix based on the sequence of media items that was previously distributed.

* * * * *